United States Patent [19]
Breton et al.

[11] Patent Number: 6,054,524
[45] Date of Patent: Apr. 25, 2000

[54] PLASTISOL HAVING A HIGH RUBBER CONTENT

[75] Inventors: Francois Jean-Marie Breton, St Genis-Laval; Hung Dang Ngoc, Limeil Brevannes, both of France

[73] Assignee: The Goodyear Tire & Rubber Company, Akron, Ohio

[21] Appl. No.: 09/150,087

[22] Filed: Sep. 9, 1998

Related U.S. Application Data

[60] Provisional application No. 60/058,257, Sep. 9, 1997.

[51] Int. Cl.$^7$ .............. C08L 27/06; C08L 9/02; C08K 5/01; B29C 41/18; C09D 127/06
[52] U.S. Cl. ............ 524/569; 524/474; 524/527; 524/571; 264/302; 264/331.13; 264/331.16; 427/375; 427/385.5; 427/388.1; 427/393.5; 427/314; 427/316; 427/318
[58] Field of Search ............ 427/314, 316, 427/318, 375, 385.5, 388.1, 388.2, 393.5; 264/302, 331.13, 331.16; 524/527, 567, 474

[56] References Cited

U.S. PATENT DOCUMENTS

| | | | |
|---|---|---|---|
| 5,658,969 | 8/1997 | Gerace | 524/569 |
| 5,686,147 | 11/1997 | Nogoc | 427/485.5 |
| 5,739,203 | 4/1998 | Ngoc | 524/569 |
| 5,840,236 | 11/1998 | Ngoc | 264/302 |

*Primary Examiner*—Peter A. Szekely
*Attorney, Agent, or Firm*—Alvin T Rockhill

[57] ABSTRACT

This invention is based upon the unexpected discovery that aliphatic solvents and secondary plasticizers act to reduce the viscosity of plastisol compositions that contain a crosslinked nitrile rubber. It has been unexpectedly found that plastisol compositions having acceptable viscosities which contain more than 30 or even 40 percent crosslinked nitrile rubber can be made by incorporating an aliphatic solvent or an aliphatic plasticizer therein. This invention more specifically discloses a plastisol composition which is comprised of (i) polyvinyl chloride, (ii) optionally, from about 60 to about 100 parts by weight of a primary plasticizer per 100 parts by weight of the polyvinyl chloride, (iii) from about 1 to about 3 parts of a stabilizer per 100 parts by weight of the polyvinyl chloride, (iv) from about 2 to about 100 parts of an aliphatic solvent or a secondary plasticizer per 100 parts by weight of the polyvinyl chloride and (v) from about 20 to about 50 parts by weight of a powdered crosslinked nitrile rubber per 100 parts of the polyvinyl chloride, wherein the powdered crosslinked nitrile rubber is comprised of repeat units which are derived from (a) 1,3-butadiene, (b) acrylonitrile and (c) a crosslinking agent, wherein said powdered crosslinked nitrile rubber has a Mooney viscosity which is within the range of about 50 to about 120, a swelling index of less than about 20 percent, a mill shrinkage of less than about 30 percent, a gel content of greater than 80 percent and a particle size of no greater than about 250 microns.

14 Claims, No Drawings

PLASTISOL HAVING A HIGH RUBBER CONTENT

This application claims the benefit of U.S. Provisional Application 60/058,257 filed Sep. 9, 1997.

BACKGROUND OF THE INVENTION

Plastisols are dispersions of homopolymers and vinyl acetate copolymers of vinyl chloride in conventional plasticizers for polyvinyl chloride. The relative amounts of the polyvinyl chloride (PVC) and plasticizer is adjusted to attain a paste of the desired consistency that can be utilized in coating a wide variety of substrates. For example, plastisols are widely used as coatings for gloves, shoes, boots, tool handles and wire goods, such as dishwasher racks, dishdrainer baskets and napkin holders.

Dipping procedures are used to coat the plastisol onto the surface of such articles. This is normally accomplished by dipping the substrate into a bath of the plastisol paste. Upon heating, gelation occurs which fuses the plastisol into a solid coating on the surface of the substrate. This heating of the plastisol can be carried out by preheating the substrate prior to dipping (hot dipping) or the substrate can be heated after being dipped into the plastisol paste (cold dipping). In either case, a desired quantity of the plastisol is coated onto the surface of the substrate and fused thereto. As a specific example, a fabric glove substrate can be dipped into a plastisol to apply a rubbery coating to the outer surface of the glove.

Over the years, attempts have been made to improve the physical properties of articles made with plastisols by incorporating a small amount of various rubbers into the plastisol composition. For instance, attempts to improve the oil resistance of plastisol-coated articles have been made by including a small amount of nitrile rubber in the plastisol composition. However, attempts to incorporate conventional rubbers into plastisol compositions have not been successful because the rubbers have caused an unacceptable increase in the viscosity of the plastisol composition. This increase in viscosity destroys the pasty consistency of the plastisol and renders it unacceptable for dipping applications.

It was recently determined that certain highly crosslinked nitrile rubbers can be incorporated into plastisol compositions without experiencing an unacceptable increase in the viscosity of the plastisol paste (see U.S. patent application Ser. No. 08/746,949, filed on Nov. 18, 1996). However, the plastisol compositions made by the technique of Ser. No. 08/746,949 contain a maximum of 30 parts of the highly crosslinked nitrile rubber. In actual practice, when more than about 20 parts of nitrile rubber are included, the plastisol becomes difficult to handle due to high viscosity.

In some applications, it would be desirable to increase the level of nitrile rubber in the plastisol above 20 parts, or even above 30 parts, to increase oil resistance, compression set and abrasion resistance. Thus, the problem associated with higher levels of the nitrile rubber increasing the viscosity of the plastisol to unacceptable levels represents a serious drawback in formulating such plastisols.

SUMMARY OF THE INVENTION

This invention is based upon the unexpected discovery that aliphatic solvents act to reduce the viscosity of crosslinked nitrile rubber containing plastisol compositions. More specifically, it has been unexpectedly found that plastisol compositions having acceptable viscosities which contain more than 30 percent crosslinked nitrile rubber can be made by incorporating an aliphatic solvent therein. In fact, plastisol compositions having acceptable viscosities which contain 40 percent or more crosslinked nitrile rubber can be made by including an aliphatic solvent therein. These plastisol compositions can be made with primary and/or secondary plasticizers. For economic reasons, primary aromatic plasticizers are normally preferred.

It has also been discovered that plastisol compositions having acceptable viscosities which contain more than 30 percent crosslinked nitrile rubber can be made in cases where secondary plasticizers are employed. In fact, plastisol compositions having acceptable viscosities which contain 40 percent or more crosslinked nitrile rubber can be made utilizing secondary plasticizers.

It has been further discovered that plastisol compositions having acceptable viscosities which contain more than 30 percent crosslinked nitrile rubber can be made utilizing a combination of a primary plasticizer and a secondary plasticizer. In other words, primary plasticizers can be used in cases where a paraffinic solvent or a secondary plasticizer is utilized to reduce the viscosity of the plastisol composition.

This invention more specifically discloses a process for applying a rubbery coating to a substrate which comprises: (1) applying to the surface of the substrate a plastisol composition which is comprised of (i) polyvinyl chloride, (ii) optionally, from about 60 to about 100 parts by weight of a primary plasticizer per 100 parts by weight of the polyvinyl chloride, (iii) from about 1 to about 3 parts of a stabilizer per 100 parts by weight of the polyvinyl chloride, (iv) from about 2 to about 100 parts by weight of an aliphatic solvent or a secondary plasticizer per 100 parts by weight of the polyvinyl chloride and (v) from about 20 to about 50 parts by weight of a powdered crosslinked nitrile rubber per 100 parts of the polyvinyl chloride, wherein the powdered crosslinked nitrile rubber is comprised of repeat units which are derived from (a) 1,3-butadiene, (b) acrylonitrile and (c) a crosslinking agent, wherein said powdered crosslinked nitrile rubber has a Mooney viscosity which is within the range of about 50 to about 120, a swelling index of less than about 20 percent, a mill shrinkage of less than about 30 percent, a gel content of greater than 80 percent and a particle size of no greater than about 250 microns; (2) heating the plastisol-coated substrate to a temperature which is within the range of about 150° C. to about 200° C. for a period which is sufficient to fuse the plastisol composition to the substrate producing a rubber-coated substrate.

The present invention further discloses a plastisol composition which is comprised of (i) polyvinyl chloride, (ii) from about 60 to about 100 parts by weight of a primary plasticizer per 100 parts by weight of the polyvinyl chloride, (iii) from about 1 to about 3 parts of a stabilizer per 100 parts by weight of the polyvinyl chloride, (iv) from about 2 to about 100 parts of an aliphatic solvent or a secondary plasticizer per 100 parts by weight of said aromatic plasticizer and (v) from about 20 to about 50 parts by weight of a powdered crosslinked nitrile rubber per 100 parts of the polyvinyl chloride, wherein the powdered crosslinked nitrile rubber is comprised of repeat units which are derived from (a) 1,3-butadiene, (b) acrylonitrile and (c) a crosslinking agent, wherein said powdered crosslinked nitrile rubber has a Mooney viscosity which is within the range of about 50 to about 120, a swelling index of less than about 20 percent, a mill shrinkage of less than about 30 percent, a gel content of greater than 80 percent and a particle size of no greater than about 250 microns.

The subject invention also reveals a plastisol composition which is comprised of (i) polyvinyl chloride, (ii) from about 60 to about 100 parts by weight of a secondary plasticizer per 100 parts by weight of the polyvinyl chloride, (iii) from about 1 to about 3 parts of a stabilizer per 100 parts by weight of the polyvinyl chloride and (iv) from about 20 to about 50 parts by weight of a powdered crosslinked nitrile rubber per 100 parts of the polyvinyl chloride, wherein the powdered crosslinked nitrile rubber is comprised of repeat units which are derived from (a) 1,3-butadiene, (b) acrylonitrile and (c) a crosslinking agent, wherein said powdered crosslinked nitrile rubber has a Mooney viscosity which is within the range of about 50 to about 120, a swelling index of less than about 20 percent, a mill shrinkage of less than about 30 percent, a gel content of greater than 80 percent and a particle size of no greater than about 250 microns.

The present invention further discloses a process for applying a rubber coating to a substrate which comprises: (1) applying a plastisol composition onto the surface of the substrate, wherein the plastisol composition is comprised of (i) polyvinyl chloride, (ii) from about 60 to about 100 parts by weight of a primary plasticizer per 100 parts by weight of the polyvinyl chloride, (iii) from about 1 to about 3 parts of a stabilizer per 100 parts by weight of the polyvinyl chloride, (iv) from about 2 to about 100 parts by weight of a paraffinic solvent or a secondary plasticizer per 100 parts by weight of the polyvinyl chloride and (v) from about 20 to about 50 parts by weight of a powdered crosslinked nitrile rubber per 100 parts of the polyvinyl chloride, wherein the powdered crosslinked nitrile rubber is comprised of repeat units which are derived from (a) 1,3-butadiene, (b) acrylonitrile and (c) a crosslinking agent, wherein said powdered crosslinked nitrile rubber has a Mooney viscosity which is within the range of about 50 to about 120, a swelling index of less than about 20 percent, a mill shrinkage of less than about 30 percent, a gel content of greater than 80 percent and a particle size of no greater than about 250 microns; and (2) heating the plastisol-coated substrate to a temperature which is within the range of about 150° C. to about 200° C. for a period which is sufficient to fuse the plastisol composition to the substrate, producing a rubber-coated substrate.

The subject invention also reveals a process for applying a rubbery coating to a substrate which comprises: (1) applying onto the substrate a bath of the plastisol composition in a manner whereby the plastisol composition comes into contact with a hot surface of the substrate, wherein the plastisol composition is comprised of (i) polyvinyl chloride, (ii) from about 60 to about 100 parts by weight of a primary plasticizer per 100 parts by weight of the polyvinyl chloride, (iii) from about 1 to about 3 parts of a stabilizer per 100 parts by weight of the polyvinyl chloride, (iv) from about 2 to about 100 parts by weight of a paraffinic solvent or a secondary plasticizer per 100 parts by weight of the polyvinyl chloride and (v) from about 20 to about 50 parts by weight of a powdered crosslinked nitrile rubber per 100 parts of the polyvinyl chloride, wherein the powdered crosslinked nitrile rubber is comprised of repeat units which are derived from (a) 1,3-butadiene, (b) acrylonitrile and (c) a crosslinking agent, wherein said powdered crosslinked nitrile rubber has a Mooney viscosity which is within the range of about 50 to about 120, a swelling index of less than about 20 percent, a mill shrinkage of less than about 30 percent, a gel content of greater than 80 percent and a particle size of no greater than about 250 microns; (2) allowing the plastisol to remain in contact with the hot surface of the substrate for a period which is sufficient to fuse the plastisol composition to the substrate producing a rubber-coated substrate; (3) removing the rubber-coated substrate from the plastisol bath; and (4) allowing the rubber-coated substrate to cool to ambient temperature after the desired degree of fusing has been attained.

The present invention further reveals a process for applying a rubber coating to a substrate which comprises: (1) applying onto the surface of the substrate a plastisol composition, wherein the plastisol composition is comprised of (i) polyvinyl chloride, (ii) from about 60 to about 100 parts by weight of a secondary plasticizer per 100 parts by weight of the polyvinyl chloride, (iii) from about 1 to about 3 parts of a stabilizer per 100 parts by weight of the polyvinyl chloride and (iv) from about 20 to about 50 parts by weight of a powdered crosslinked nitrile rubber per 100 parts of the polyvinyl chloride, wherein the powdered crosslinked nitrile rubber is comprised of repeat units which are derived from (a) 1,3-butadiene, (b) acrylonitrile and (c) a crosslinking agent, wherein said powdered crosslinked nitrile rubber has a Mooney viscosity which is within the range of about 50 to about 120, a swelling index of less than about 20 percent, a mill shrinkage of less than about 30 percent, a gel content of greater than 80 percent and a particle size of no greater than about 250 microns; and (2) heating the plastisol-coated substrate to a temperature which is within the range of about 150° C. to about 200° C. for a period which is sufficient to fuse the plastisol composition to the substrate producing a rubber-coated substrate.

The subject invention also discloses a process for applying a rubbery coating to a substrate which comprises: (1) applying onto the substrate a bath of the plastisol composition in a manner whereby the plastisol composition comes into contact with a hot surface of the substrate, wherein the plastisol composition is comprised of (i) polyvinyl chloride, (ii) from about 60 to about 100 parts by weight of a secondary plasticizer per 100 parts by weight of the polyvinyl chloride, (iii) from about 1 to about 3 parts of a stabilizer per 100 parts by weight of the polyvinyl chloride and (iv) from about 20 to about 50 parts by weight of a powdered crosslinked nitrile rubber per 100 parts of the polyvinyl chloride, wherein the powdered crosslinked nitrile rubber is comprised of repeat units which are derived from (a) 1,3-butadiene, (b) acrylonitrile and (c) a crosslinking agent, wherein said powdered crosslinked nitrile rubber has a Mooney viscosity which is within the range of about 50 to about 120, a swelling index of less than about 20 percent, a mill shrinkage of less than about 30 percent, a gel content of greater than 80 percent and a particle size of no greater than about 250 microns; (2) allowing the plastisol to remain in contact with the hot surface of the substrate for a period which is sufficient to fuse the plastisol composition to the substrate producing a rubber-coated substrate; (3) removing the rubber-coated substrate from the plastisol bath; and (4) allowing the rubber-coated substrate to cool to ambient temperature after the desired degree of fusing has been attained.

DETAILED DESCRIPTION OF THE INVENTION

A wide variety of crosslinked nitrile rubbers can be utilized in the plastisol compositions of this invention. The crosslinked nitrile rubbers utilized in the practice of this invention are typically synthesized utilizing a free radical emulsion polymerization technique. These crosslinked nitrile rubbers are normally comprised of repeat units which are derived from (a) 1,3-butadiene, (b) acrylonitrile and (c) a crosslinking agent. The crosslinking agent is typically a multi-functional acrylate, a multi-functional methacrylate or divinylbenzene. Some specific examples of crosslinking agents which can be used include ethylene glycol methacrylate, trimethylol propane trimethacrylate (TRIM), divinylbenzene (DVB) and 1,4-butanediol dimethacrylate.

The crosslinked nitrile rubbers utilized in the practice of this invention normally contain repeat units (chain linkages) which are derived from (a) 1,3-butadiene, (b) acrylonitrile and (c) a crosslinking agent. These repeat units differ from the monomers that they were derived from in that they contain one less carbon—carbon double bond than is present in the respective monomer. In other words, a carbon-to-carbon double bond is consumed during the polymerization of the monomer into a repeat unit in the crosslinked rubbery polymer. Thus, in saying that the crosslinked nitrile rubber contains various monomers in actuality means that it contains repeat units which are derived from those monomers.

A preferred crosslinked nitrile rubber which can be utilized in the practice of this invention contains (a) from about 45 weight percent to about 79 weight percent butadiene, (b) from about 20 weight percent to about 50 weight percent acrylonitrile and (c) from about 0.5 weight percent to about 5 weight percent of a crosslinking agent. Such crosslinked nitrile rubbers will preferably contain (a) from about 58 weight percent to about 71 weight percent butadiene, (b) from about 28 weight percent to about 38 weight percent acrylonitrile and (c) from about 1 weight percent to about 4 weight percent of the crosslinking agent. The crosslinked nitrile rubber will more preferably contain from about 1.5 weight percent to about 3.5 weight percent of the crosslinking agent. The percentages reported in this paragraph are based upon the total weight of the highly crosslinked nitrile rubber.

The preferred amount of crosslinking agent will vary with the polymerization technique employed in synthesizing the crosslinked nitrile rubber. As a general rule, higher levels of the crosslinking agent are needed at lower polymerization temperatures. By the same token, lower levels of the crosslinking agent are needed in cases where higher polymerization temperatures are employed. The percentages reported herein are based upon the total weight of the highly crosslinked nitrile rubber.

A wide variety of crosslinking agents can be utilized in carrying out the polymerization process used in the synthesis of the crosslinked nitrile rubber. Some representative examples of crosslinking agents which can be utilized include difunctional acrylates, difunctional methacrylates, trifunctional acrylates, trifunctional methacrylates and divinylbenzene. Proven to be particularly useful as the crosslinking agent is 1,4-butanediol dimethacrylate.

The crosslinked nitrile rubber is normally synthesized in an aqueous reaction medium by utilizing a free radical polymerization technique. Optionally, redox initiator systems can be employed in the synthesis of the crosslinked nitrile rubber. The reaction mixture utilized in such free radical emulsion polymerization techniques is comprised of water, 1,3-butadiene monomer, acrylonitrile monomer, a suitable free radical initiator, a crosslinking agent, a chain modifier and one or more emulsifying agents.

The modifier will normally be a mercaptan, such as t-dodecylmercaptan. The chain modifier will normally be present in an amount which is within the range of about 0.1 phm to 1 phm (parts by weight per 100 parts by weight of monomer). At low polymerization temperatures, relatively low amounts of the modifier are required. At high polymerization temperatures, higher amounts of the modifier are required. The modifier level can be adjusted to obtain the desired rubber Mooney viscosity.

The reaction mixture utilized in this polymerization technique will normally contain from about 10 weight percent to about 80 weight percent monomers (1,3-butadiene, acrylonitrile and the crosslinking agent), based upon the total weight of the reaction mixture. The reaction mixture will preferably contain from about 20 weight percent to about 70 weight percent monomers and will more preferably contain from about 30 weight percent to about 50 weight percent monomers.

The emulsifiers used in the polymerization of such polymers may be charged at the outset of the polymerization or may be added incrementally or by proportioning as the reaction proceeds. Generally, anionic emulsifier systems provide good results; however, any of the general types of anionic, cationic or nonionic emulsifiers may be employed in the polymerization.

Generally, from about 1 to about 6 phm (parts by weight per 100 parts by weight of monomer) of the emulsifier is utilized in preparing the aqueous reaction mixture utilized in the emulsion polymerization technique. It has been determined that the use of less than about 1 phm of surfactant can lead to latex instability. On the other hand, the utilization of more than about 6 phm of surfactant can lead to isolation problems. In most cases, it will be preferred to utilize from about 2 phm to about 4 phm of the emulsifier. The precise amount of emulsifier required in order to attain optimal results will, of course, vary with the specific emulsifier being used and with the monomer ratios being employed. However, persons skilled in the art will be able to easily ascertain the specific amount of emulsifier required in order to attain optimal results.

Among the anionic emulsifiers that can be employed in emulsion polymerizations are fatty acids and their alkali metal soaps such as caprylic acid, capric acid, pelargonic acid, lauric acid, undecyclic acid, myristic acid, palmitic acid, margaric acid, stearic acid, arachidic acid, and the like; amine soaps of fatty acids such as those formed from ammonia, mono- and dialkyl amines, substitute hydrazines, guanidine and various low molecular weight diamines; chain-substituted derivatives of fatty acids such as those having alkyl substituents; napthenic acids and their soaps and the like; sulfuric esters and their salts, such as the tallow alcohol sulfates, coconut alcohol sulfates, fatty alcohol sulfates, such as oleyl sulfate, sodium lauryl sulfate and the like; sterol sulfates, sulfates of alkylcyclohexanols, sulfation products of lower polymers of ethylene as $C_{10}$ to $C_{20}$ straight chain olefins and other hydrocarbon mixtures, sulfuric esters of aliphatic and aromatic alcohols having intermediate linkages, such as ether, ester or amide groups such as alkylbenzyl (polyethyleneoxy) alcohols, the sodium salt of tridecyl ether sulfate; alkane sulfonates, esters and salts, such as alkylchlorosulfonates with the general formula $RSO_2Cl$, wherein R is an alkyl group having from 1 to 20 carbon atoms, and alkylsulfonates with the general formula $RSO_2$—OH, wherein R is an alkyl group having from 1 to 20 carbon atoms; sulfonates with intermediate linkages such as ester and ester-linked sulfonates such as those having the formula $RCOOC_2H_4SO_3H$ and $ROOC—CH_2—SO_3H$, wherein R is an alkyl group having from 1 to 20 carbon atoms such as dialkyl sulfosuccinates; ester salts with the general formula:

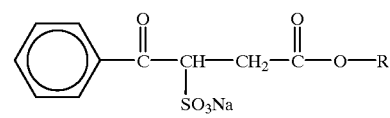

wherein R is an alkyl group having from 1 to 20 carbon atoms; alkaryl sulfonates in which the alkyl groups contain preferably from 10 to 20 carbon atoms, e.g., dodecylbenzenesulfonates, such as sodium dodecylbenzenesulfonate; alkyl phenol sulfonates; sulfonic acids and their salts such as acids with the formula RSO₃Na, wherein R is an alkyl and the like; sulfonamides, sulfamido methylenesulfonic acids; rosin acids and their soaps; sulfonated derivatives of rosin and rosin oil; and lignin sulfonates, and the like.

Rosin acid soap has been used with good success at a concentration of about 5 percent by weight in the initial charge composition used in the synthesis of carboxylated elastomers. Of rosin acids, about 90 percent are isometric with abietic acid and the other 10 percent is a mixture of dehydro abietic acid and dihydro abietic acid.

Sulfonate surfactants are particularly useful as emulsifying agents (soaps) in the practice of this invention. Sulfonate surfactants are commercially available from a wide variety of sources. For instance, DuPont sells sodium alkylarylsulfonate under the tradename Alkanol™, Browning Chemical Corporation sells sodium dodecylbenzene sulfonates under the tradename Ufaryl™ D1-85 and Ruetgers-Nease Chemical Company sells sodium cumene sulfonate under the tradename Naxonate Hydrotrope™. Some representative examples of sulfonate surfactants which can be used include sodium toluene-xylene sulfonate, sodium toluene sulfonate, sodium cumene sulfonates, sodium decyldiphenylether sulfonate, sodium dodecylbenzenesulfonate, sodium dodecyldiphenylether sulfonate, sodium 1-octane sulfonate, sodium tetradecane sulfonate, sodium pentadecane sulfonate, sodium heptadecane sulfonate and potassium toluene sulfonate.

Metal salts of alkylbenzene sulfonates are a highly preferred class of sulfonate surfactant. The metal will generally be sodium or potassium with sodium being preferred. Sodium salts of alkylbenzene sulfonates have the structural formula:

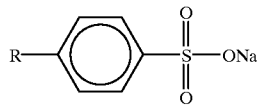

wherein R represents an alkyl group containing from 1 to about 20 carbon atoms. It is preferred for the alkyl group to contain from about 8 to about 14 carbon atoms.

The free radical polymerization technique utilized in this synthesis is normally initiated by including a free radical initiator in the reaction mixture. Virtually any type of compound capable of generating free radicals can be utilized as the free radical initiator. The free radical generator is normally employed at a concentration within the range of about 0.01 phm to about 1 phm. The free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutylronitrile, 2-t-butylazo-1-cyanocyclohexane, 1-t-amylazo-1-cyanocyclohexane, and the like, the various alkyl perketals, such as 2,2-bis-(t-butyl-peroxy)butane, and the like. Water-soluble peroxygen-free radical initiators are especially useful in such aqueous polymerizations.

The emulsion polymerizations utilized in synthesizing the crosslinked nitrile rubber is typically carried out at a temperature ranging between about 2° C. and about 70° C. At temperatures below 0° C., the aqueous polymerization mixture can freeze and, at temperatures above 70° C., the polymerization reaction becomes difficult to control. It is generally preferred to conduct the polymerization at a temperature which is within the range of about 5° C. to about 50° C.

In most cases, the polymerization will be continued until a high monomer conversion of at least about 85 percent has been attained. It is normally preferred to allow the polymerization to continue until a monomer conversion of at least about 95 percent has been attained. It is generally most preferred to allow the polymerization to continue until a monomer conversion which is within the range of about 96 percent to about 99 percent has been attained. At this point, the polymerization reaction is shortstopped with a conventional shortstopping agent, such as hydroquinone. A good time to add conventional antioxidants to the latex is after the shortstopping agent has been added.

After addition of an antioxidant into the latex, the crosslinked nitrile rubber composition made by the emulsion polymerization process is recovered from the emulsion (latex). This can be accomplished by utilizing standard coagulation techniques or by spray drying. For instance, coagulation can be accomplished by the addition of salts, acid or both to the latex.

A review of coagulation techniques for nitrile rubbers is presented in Hofmann, Werner "Nitrile Rubber," *Rubber Chemistry and Technology,* Vol 37, No. 2, part 2 (April–June 1964), pp. 94–96, which is incorporated herein by reference. Many of these coagulation techniques will be useful for the crosslinked nitrile rubbers that can be employed in the practice of this invention. Coagulation with acid or blends of salts with acids is usually very satisfactory. For example, sulfuric acid, hydrochloric acid, blends of sodium chloride with sulfuric acid and blends of hydrochloric acid with methanol are very effective as coagulation agents for nitrile rubber emulsions. Calcium chloride solutions which are free of calcium hydroxide can also be used as coagulants with good success.

After coagulation, washing may be employed to remove excess soap and/or electrolyte from the rubber. Sometimes washing is also useful in adjusting the pH of the elastomer that has been synthesized. After washing, the elastomer will normally be dewatered and dried.

The crosslinked nitrile rubber utilized in the plastisol compositions of this invention will normally have a gel content of greater than about 90 percent, a swelling index of less than about 10 percent, a mill shrinkage of less than about 10 percent and a Mooney viscosity of about 50 to about 120. The highly crosslinked nitrile rubber will preferably have a gel content of greater than about 95 percent, a swelling index of less than about 7 percent, a mill shrinkage of less than about 8 percent and a Mooney viscosity of about 55 to about 110. The highly crosslinked nitrile rubber will more preferably have a mill shrinkage of less than about 5 percent. For purposes of this patent application, the gel content and swelling index of the crosslinked nitrile rubber are determined by ASTM Test Method D3618-88. Mill shrinkage is determined by ASTM Test Method D1917.

It is important to convert the crosslinked nitrile rubber composition into a powder having a particle size of no more than about 250 microns to facilitate its blending with PVC to make the plastisol compositions. It is normally preferred for the crosslinked nitrile rubber to be in the form of a powder having a particle size of no more than about 150 microns with it being more preferred for the crosslinked nitrile rubber powder to have a particle size of 100 microns or less. It is accordingly beneficial to add a partitioning agent to the crosslinked nitrile rubber composition. Some representative examples of partitioning agents which can be employed include calcium carbonate, polyvinyl chloride resin, zinc stearate, calcium stearate and silica.

The plastisol compositions of this invention can be easily prepared by employing standard mixing procedures. For instance, the plastisols of this invention are typically prepared by first blending the plasticizer with the aliphatic solvent. Then the crosslinked nitrile rubber composition is typically mixed into the blend of the plasticizer and the aliphatic solvent. Finally, the polyvinylchloride (PVC), and any other ingredients, are mixing into the rubber/solvent/plasticizer mixture utilizing standard mixing techniques. In most cases, an antidegredant will be added to the blend to protect the PVC from degradation.

A wide variety of plasticizers which are compatible with the polyvinyl chloride resin can be employed. The plasticizers employed will normally be in the liquid form and can be aromatic or aliphatic in nature. In actual practice, many plasticizers have both aromatic and aliphatic components. The term "primary plasticizer" as used herein means a plasticizer that exhibits a weight loss during kerosene extraction of less than 45 percent as measured after 24 hours at 23° C. by ASTM D1239-55. The primary plasticizer will typically exhibit a weight loss during kerosene extraction of no more than 30 percent. In many cases, the primary plasticizer will exhibit a weight loss during kerosene extraction of less than about 20 percent. Some representative examples of primary plasticizers include diethylene glycol dibenzoate, dipropylene glycol dibenzoate, 2,2,4-trimethyl-1,3-pentanediol isobutyrate benzoate, tricresyl phosphate, isopropylphenyl diphenyl phosphate, t-butylphenyl diphenyl phosphate, 2-ethylhexyl diphenyl phosphate, isodecyl diphenyl phosphate, dibutyl phthalate, butyl octyl phthalate, heptyl nonyl phthalate, bis(2-ethylhexyl)phthalate, butyl benzyl phthalate, alkyl benzyl phthalate (Santicizer 261), high molecular weight benzyl phthalate (Santicizer 278), bis(2-butoxyethyl) phthalate, dicyclohexyl phthalate, diphenyl phthalate, and alkyl sulfonic acid esters of phenol and cresol (Mesamoll).

The term "secondary plasticizer" as used herein means a plasticizer that exhibits a weight loss during kerosene extraction of at least about 50 percent as measured after 24 hours at 23° C. by ASTM D1239-55. The secondary plasticizers used in the practice of this invention will typically exhibit a weight loss during kerosene extraction of at least about 60 percent. The secondary plasticizers used in the practice of this invention will preferably exhibit a weight loss during kerosene extraction of at least about 70 percent. Some representative examples of secondary plasticizers include hepthy nonyl adipate, bis(2-ethylhexyl) adipate, diisodecyl adipate, bis(2-ethylhexyl) azelate, 2-ethylhexyl epoxy tallate, tris(2-ethylhexyl) phosphate, di(heptyl nonyl undecyl) phthalate, (n-hexyl, n-octyl, n-decyl) phthalate, diisononyl phthalate, diisodecyl phthalate, diundecyl phthalate, ditridecyl phthalate, bis(2-ethylhexyl) sebacate, butyl acetoxystearate, bis(2-ethylhexyl) terephthalate, tris (2-ethylhexyl) trimellitate and heptyl nonyl trimellitate.

The aliphatic solvents that can be employed in making the plastisol compositions of this invention will normally contain less than about 2 weight percent aromatic compounds. It is normally preferred for the aliphatic solvent to contain less than about 1 percent aromatic compounds. For instance, the aliphatic solvent can be an alkane or mixture of alkanes that are liquids at room temperature (about 21° C.), such as n-hexane or cyclo-hexane. Exxsol™ D30, Exxsol™ D40 and Isopar™ G are some representative examples of aliphatic solvents that are readily commercially available and which are highly suitable for utilization in the practice of this invention.

The plastisols of this invention normally contain from about 20 parts by weight to about 50 parts by weight of the crosslinked nitrile rubber composition and about 70 parts by weight to about 100 parts by weight of the plasticizer per 100 parts by weight of the polyvinylchloride. It is typically preferred for such rubbery compositions to contain from about 30 to about 45 parts by weight of the crosslinked nitrile rubber composition and from about 75 parts by weight to about 90 parts by weight of the plasticizer per 100 parts by weight of the polyvinylchloride. In many applications, it will be desirable for the plastisol composition to contain from about 35 to about 50 parts by weight of the crosslinked nitrile rubber per 100 parts by weight of the polyvinylchloride. In some applications, it will be preferred for the plastisol composition to contain from about 40 to about 50 parts by weight of the crosslinked nitrile rubber per 100 parts by weight of the polyvinylchloride.

In cases where the plastisol composition contains a primary plasticizer, it will, of course, also contain a paraffinic solvent and/or a secondary plasticizer. The paraffinic solvent or secondary plasticizer will normally be present in an amount which is within the range of about 2 parts to about 100 parts by weight per 100 parts by weight of the primary plasticizer. It is generally preferred for 4 parts to 50 parts by weight of the paraffinic solvent or secondary plasticizer to be present per 100 parts by weight of the primary plasticizer. It is typically most preferred for 5 parts to 20 parts by weight of the paraffinic solvent or secondary plasticizer to be present per 100 parts by weight of the primary plasticizer.

The plastisol compositions of this invention will typically contain fillers chiefly to reduce cost. However, fillers also tend to increase paste viscosity, increase yield value (increase the oil absorption properties of the plastisol), increase hardness, lower tensile properties and increase cold and heat flow. Calcium carbonates, clays and silicas are some representative examples of fillers which can be used. Colorants can, of course, also be added to the plastisol composition to attain the desired color.

The plastisol compositions of this invention can be utilized in conventional dipping procedures. In such procedures, the plastisol will normally be fused at a temperature which is within the range of about 150° C. to about 200° C. The plastisol is normally fused at a temperature which is within the range of about 155° C. to about 190° C. To attain a commercially viable rate of fusing and to limit thermal degradation, the fusion will often be carried out at a temperature which is within the range of about 160° C. to about 180° C.

In hot dipping procedures, the substrate being coated is normally heated to an elevated temperature and then submerged in a bath of plastisol to a predetermined height for a predetermined period. Cooling coils are generally utilized in the plastisol bath to counterbalance the heat being brought into the plastisol bath by the heated substrates. Mild agitation is also frequently used to keep components of the plastisol composition, such as fillers, well mixed. After the dipping step has been completed, the substrate is removed from the plastisol bath and excess plastisol is allowed to drip off or is removed mechanically. After the excess plastisol has been removed in the draining step, the plastisol-coated substrate is typically passed through a fusion oven to complete the fusion process. After the fusion step has been completed, the substrate is, of course, allowed to cool to ambient temperature.

Cold dipping processes are used in cases where the substrate being coated cannot be preheated. In such cold dipping processes, the substrate is simply dipped into the plastisol bath to a predetermined height without being preheated. In such cold dipping precesses, the rheology of the plastisol paste is adjusted to control the weight of the plastisol picked up and the coating thickness. Plastisol formulations for use in cold dipping operations accordingly rely upon yield building materials, such as silicas, clays or magnesium organic derivatives, to control coating thickness. After being coated with the desired quantity of plastisol, the substrate is removed from the plastisol bath and is heated to bring about the fusion process. This is typically done by passing the substrate through a fusion oven. After the fusion step has been completed, the substrate is, of course, allowed to cool to ambient temperature.

This invention is illustrated by the following examples which are merely for the purpose of illustration and are not to be regarded as limiting the scope of this invention or the manner in which it can be practiced. Unless specifically indicated otherwise, all parts and percentages are given by weight.

EXAMPLES 1–5

In this experiment, plastisol compositions were prepared using various aliphatic solvents to reduce the viscosity thereof. These plastisol compositions were prepared by mixing 50 phr (parts per 100 parts of rubber) of the aliphatic solvents identified in Table I into the crosslinked nitrile rubber powder utilized in making the plastisol composition. In the procedure used, 50 phr the aliphatic solvent was mixed into Chemigum® P7546 crosslinked nitrile rubber powder. Then, 100 parts of dioctylphthalate (DOP) plasticizer was mixed into 40 parts of the blend of aliphatic solvent and nitrile rubber. Finally, 100 parts of polyvinylchloride and 3 parts of dibutyl tin dilaurate were mixed into the blend.

The viscosities of the plastisol compositions made were then determined at various shear rates. The viscosities of these plastisols are reported in Table I. Example 1 was carried out as a control (a comparative example) and did not include any aliphatic solvent.

TABLE I

|  | Example | | | | |
| --- | --- | --- | --- | --- | --- |
|  | 1 | 2 | 3 | 4 | 5 |
| Solvent | none | Exxol D40 | Isopar G | Dowanol MP | WS < 5 |
| $\eta @ \dot\gamma = 10^0 \text{ s}^{-1}$ | 1112 | 220 | 270 | 170 | 300 |
| $\eta @ \dot\gamma = 10^1 \text{ s}^{-1}$ | 229 | 15 | 17 | 26 | 16 |
| $\eta @ \dot\gamma = 10^2 \text{ s}^{-1}$ | 31.2 | 1.8 | 1.4 | 9.8 | 1.6 |
| $\eta @ \dot\gamma = 10^3 \text{ s}^{-1}$ | 3.1 | 0.15 | 0.6 | 2.5 | 0.4 |

As can be seen from Table I, all of the aliphatic solvents evaluated greatly reduced the viscosity of the plastisol compositions over a range of shear rates from $\dot\gamma=10^0 \text{ s}^{-1}$ to $\dot\gamma=10^3 \text{ s}^{-1}$. Thus, this series of experiments shows that aliphatic solvents can be used to greatly reduce the viscosity of plastisols that contain primary plasticizers.

EXAMPLES 6–10

In this series of experiments, various crosslinked nitrile rubbers (Chemigum® P7546 nitrile rubber, Chemigum® P35 nitrile rubber, Chemigum® P83 nitrile rubber, Chemigum® P86 nitrile rubber and Krynac® 3820 nitrile rubber) were evaluated in plastisol compositions using the procedure described in Examples 1–5. However, in this series of experiments, 20 phr of Isopar G was employed as the aliphatic solvent. The viscosities of the plastisol compositions made were then determined at various shear rates. The viscosities of the plastisols made are reported in Table II.

TABLE II

|  | Example | | | | |
| --- | --- | --- | --- | --- | --- |
|  | 6 | 7 | 8 | 9 | 10 |
| Rubber | P7456 | P35 | P83 | P86 | Kyrnac 3820 |
| $\eta @ \dot\gamma = 10^0 \text{ s}^{-1}$ | 234 | 251 | 181 | 244 | 294 |
| $\eta @ \dot\gamma = 10^1 \text{ s}^{-1}$ | 24.3 | 25.3 | 23.4 | 23.5 | 25.8 |
| $\eta @ \dot\gamma = 10^2 \text{ s}^{-1}$ | 3.42 | 4.47 | 3.35 | 5.37 | 1.48 |
| $\eta @ \dot\gamma = 10^3 \text{ s}^{-1}$ | 0.51 | 0.57 | 0.53 | 1.39 | 0.51 |

As can be seen from Table II, the Isopar G aliphatic solvent greatly reduced the viscosity of the plastisol compositions over a range of shear rates from $\dot\gamma=10^0 \text{ s}^{-1}$ to $\dot\gamma=10^3 \text{ s}^{-1}$. Thus, this series of experiments shows that aliphatic solvents can be used to greatly reduce the viscosity of plastisols made with a wide variety of crosslinked nitrile rubbers.

While certain representative embodiments and details have been shown for the purpose of illustrating the subject invention, it will be apparent to those skilled in this art that various changes and modifications can be made therein without departing from the scope of the subject invention.

What is claimed is:

1. A process for applying a rubbery coating to a substrate which comprises: (1) applying to the surface of the substrate a plastisol composition which is comprised of (i) polyvinyl chloride, (ii) optionally, from about 60 to about 100 parts by weight of a primary plasticizer per 100 parts by weight of the polyvinyl chloride, (iii) from about 1 to about 3 parts of a stabilizer per 100 parts by weight of the polyvinyl chloride, (iv) from about 2 to about 100 parts by weight of a paraffinic solvent or a secondary plasticizer per 100 parts by weight of said primary plasticizer and (v) from about 35 to about 50 parts by weight of a powdered crosslinked nitrile rubber per 100 parts of the polyvinyl chloride, wherein the powdered crosslinked nitrile rubber is comprised of repeat units which are derived from (a) 1,3-butadiene, (b) acrylonitrile and (c) a crosslinking agent, wherein said powdered crosslinked nitrile rubber has a Mooney viscosity which is within the range of about 50 to about 120, a swelling index of less than about 20 percent, a mill shrinkage of less than about 30 percent, a gel content of greater than 80 percent and a particle size of no greater than about 250 microns; (2) heating the plastisol-coated substrate to a temperature which is within the range of about 150° C. to about 200° C. for a period which is sufficient to fuse the plastisol composition to the substrate producing a rubber-coated substrate.

2. A plastisol composition which is comprised of (i) polyvinyl chloride, (ii) from about 60 to about 100 parts by weight of a primary plasticizer per 100 parts by weight of the polyvinyl chloride, (iii) from about 1 to about 3 parts of a stabilizer per 100 parts by weight of the polyvinyl chloride, (iv) from about 2 to about 100 parts of an aliphatic solvent or a secondary plasticizer per 100 parts by weight of said primary plasticizer and (v) from about 35 to about 50 parts by weight of a powdered crosslinked nitrile rubber per 100 parts of the polyvinyl chloride, wherein the powdered crosslinked nitrile rubber is comprised of repeat units which are derived from (a) 1,3-butadiene, (b) acrylonitrile and (c) a crosslinking agent, wherein said powdered crosslinked nitrile rubber has a Mooney viscosity which is within the range of about 50 to about 120, a swelling index of less than about 20 percent, a mill shrinkage of less than about 30 percent, a gel content of greater than 80 percent and a particle size of no greater than about 250 microns.

3. A process for applying a rubber coating to a substrate which comprises: (1) applying a plastisol composition onto the surface of the substrate, wherein the plastisol composition is comprised of (i) polyvinyl chloride, (ii) from about 60 to about 100 parts by weight of a primary plasticizer per 100 parts by weight of the polyvinyl chloride, (iii) from about 1 to about 3 parts of a stabilizer per 100 parts by weight of the polyvinyl chloride, (iv) from about 2 to about 100 parts by weight of a paraffinic solvent or a secondary plasticizer per 100 parts by weight of the primary plasticizer and (v) from about 35 to about 50 parts by weight of a powdered crosslinked nitrile rubber per 100 parts of the polyvinyl chloride, wherein the powdered crosslinked nitrile rubber is comprised of repeat units which are derived from (a) 1,3-butadiene, (b) acrylonitrile and (c) a crosslinking agent, wherein said powdered crosslinked nitrile rubber has a Mooney viscosity which is within the range of about 50 to about 120, a swelling index of less than about 20 percent, a mill shrinkage of less than about 30 percent, a gel content of greater than 80 percent and a particle size of no greater than about 250 microns; and (2) heating the plastisol-coated substrate to a temperature which is within the range of about 150° C. to about 200° C. for a period which is sufficient to fuse the plastisol composition to the substrate producing a rubber-coated substrate.

4. A process for applying a rubbery coating to a substrate which comprises: (1) applying onto the surface of the substrate a bath of a plastisol composition in a manner whereby the plastisol composition comes into contact with a hot surface of the substrate, wherein the plastisol composition is comprised of (i) polyvinyl chloride, (ii) from about 60 to about 100 parts by weight of a primary plasticizer per 100 parts by weight of the polyvinyl chloride, (iii) from about 1 to about 3 parts of a stabilizer per 100 parts by weight of the polyvinyl chloride, (iv) from about 2 to about 100 parts by weight of a paraffinic solvent or a secondary plasticizer per 100 parts by weight of said primary plasticizer and (v) from about 35 to about 50 parts by weight of a powdered crosslinked nitrile rubber per 100 parts of the polyvinyl chloride, wherein the powdered crosslinked nitrile rubber is comprised of repeat units which are derived from (a) 1,3-butadiene, (b) acrylonitrile and (c) a crosslinking agent, wherein said powdered crosslinked nitrile rubber has a Mooney viscosity which is within the range of about 50 to about 120, a swelling index of less than about 20 percent, a mill shrinkage of less than about 30 percent, a gel content of greater than 80 percent and a particle size of no greater than about 250 microns; (2) allowing the plastisol to remain in contact with the hot surface of the substrate for a period which is sufficient to fuse the plastisol composition to the substrate producing a rubber-coated substrate; (3) removing the rubber-coated substrate from the plastisol bath; and (4) allowing the rubber-coated substrate to cool to ambient temperature after the desired degree of fusing has been attained.

5. A plastisol composition as specified in claim 2 wherein said crosslinked nitrile rubber has a particle size of no greater than about 150 microns.

6. A plastisol composition as specified in claim 2 wherein the secondary plasticizer exhibits a weight loss during kerosene extraction of at least 50 percent as measured after 24 hours at 23° C. by ASTM D1239-55.

7. A plastisol composition as specified in claim 6 wherein the secondary plasticizer exhibits a weight loss during kerosene extraction of at least 60 percent as measured after 24 hours at 23° C. by ASTM D1239-55.

8. A plastisol composition as specified in claim 7 wherein from 40 parts by weight to about 50 parts by weight of the crosslinked nitrile rubber is present per 100 parts by weight of the polyvinylchloride.

9. A plastisol composition as specified in claim 6 wherein said secondary plasticizer exhibits a weight loss during kerosene extraction of at least 70 percent as measured after 24 hours at 23° C. by ASTM D1239-55.

10. A plastisol composition as specified in claim 9 wherein said crosslinked nitrile rubber has a particle size of no greater than about 100 microns.

11. A plastisol composition as specified in claim 2 wherein an aliphatic solvent is utilized as component (iv).

12. A plastisol composition as specified in claim 2 wherein a secondary plasticizer is utilized as component (iv).

13. A plastisol composition as specified in claim 12 wherein said secondary plasticizer exhibits a weight loss during kerosene extraction of at least 60 percent as measured after 24 hours at 23° C. by ASTM D1239-55.

14. A plastisol composition as specified in claim 13 wherein said crosslinked nitrile rubber has a particle size of no greater than about 150 microns.

* * * * *